Figure 4:
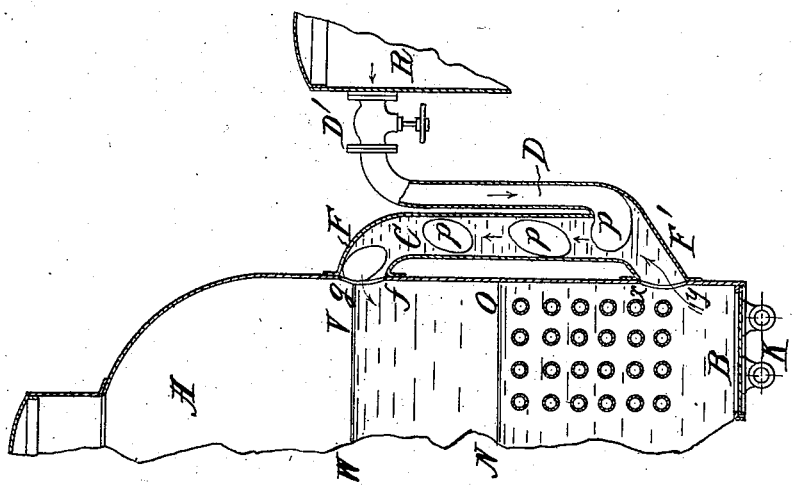

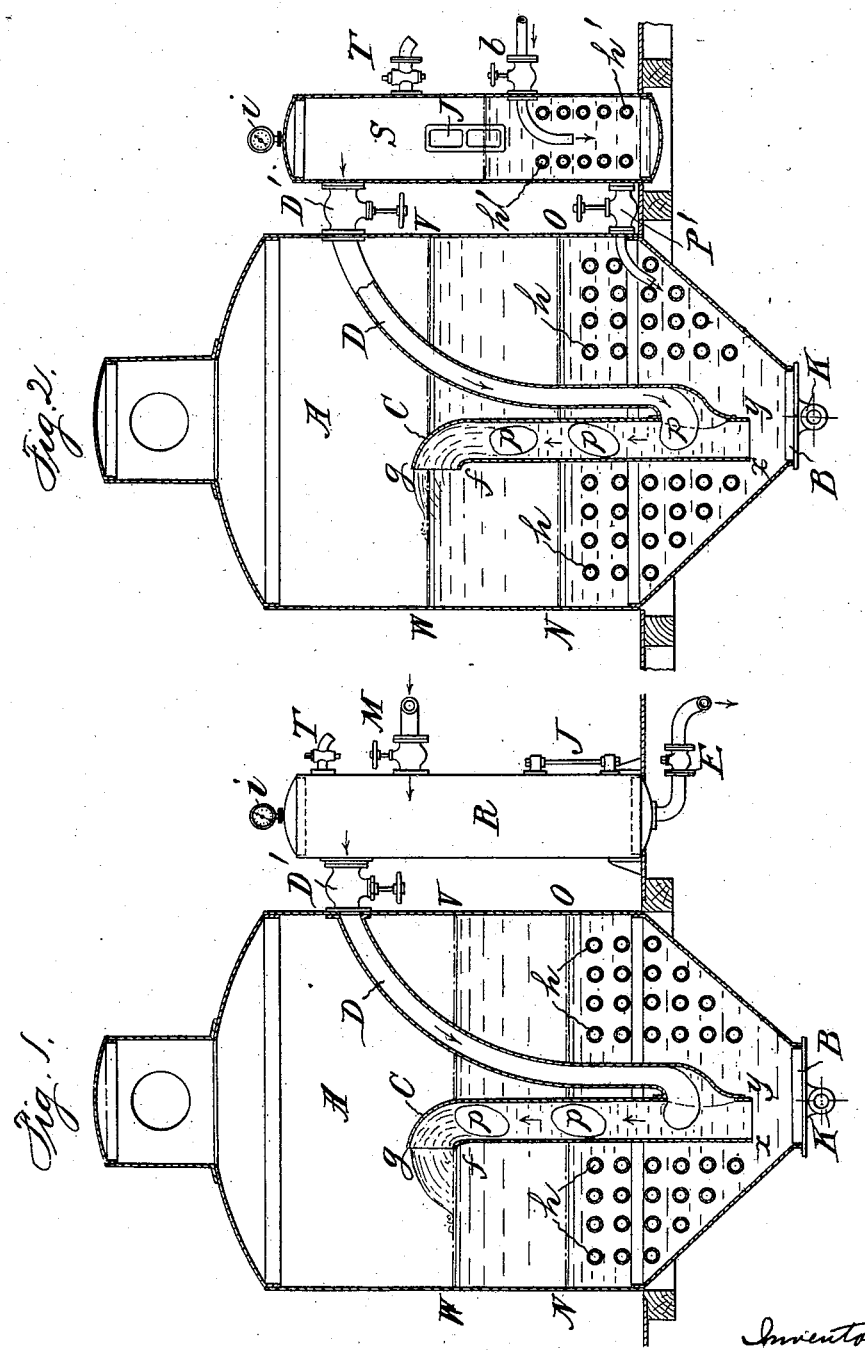

No. 703,496.

C. STEFFEN.
PROCESS OF SUGAR BOILING.
(Application filed Aug. 8, 1898.)

Patented July 1, 1902.

(No Model.)

2 Sheets—Sheet 2.

UNITED STATES PATENT OFFICE.

CARL STEFFEN, OF VIENNA, AUSTRIA-HUNGARY.

PROCESS OF SUGAR-BOILING.

SPECIFICATION forming part of Letters Patent No. 703,496, dated July 1, 1902.

Application filed August 8, 1898. Serial No. 688,082. (No specimens.)

*To all whom it may concern:*

Be it known that I, CARL STEFFEN, a subject of the Emperor of Austria, residing at Vienna, in the Province of Lower Austria, in the Empire of Austria-Hungary, have invented certain new and useful Improvements in Process of Sugar-Boiling; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

In the ordinary constructions of vacuum boiling apparatus for sugar the production of properly-formed crystals and mother-liquors that are exhausted of their sugar to the greatest possible extent has been attempted by subjecting a large quantity of the sugar liquid to a protracted boiling operation. This, however, renders necessary the use of large vessels with high columns of liquid, which has an injurious effect on the boiling operation, because high columns of liquid produce considerable differences of temperature in their various horizontal layers on account of the sugar masses being bad conductors of heat and difficult to circulate in consequence of their high specific gravity and of the contained crystals.

As the heating-surfaces must be arranged as low as possible—that is to say, at the foot of the liquid column—in order that the granulation of the mass may be started early in the smaller portion of the sugar liquid, considerable overheating, and consequently great supersaturation of the sugar liquid will take place in the vicinity of the heating-surfaces; but, as is well known, the formation and development of the sugar crystals depends on the concentration, the temperature, and the purity of the sugar liquid. Consequently great overheating will produce an unfavorable action upon the course of the crystallization, which may sometimes be even interrupted, especially in the case of impure masses. Hitherto attempts have been made to obviate the foregoing drawbacks by providing in the vacuum apparatus mechanical stirring devices after the manner of ships' propellers or helical mash-stirring devices, these devices having for object to cause the sugar masses to travel quickly along or over the heating-surfaces of the vacuum apparatus and to produce a uniform mixture of the entire mass in the vacuum; but it has been found by experience that devices of this kind are of no appreciable utility, because large masses have to be moved, and also the physical nature of the crystal masses is a hindrance to their rapid removal from the heating-surfaces in an upward direction up to or beyond the level of the liquid. Further, the stirring of the boiling sugar mass in the vacuum with steam, as has been proposed, cannot produce that circulation and upward movement of the sugar masses at the heating-surfaces which is necessary. In particular the amount of steam which can practically be employed for this purpose and which enters freely into the entire sugar mass rises directly upward without appreciable upward movement of the latter, the steam dividing the dense sugar mass and passing up therethrough. Neither is the desired object effected by the introduction of steam-jets of great velocity into the sugar mass, because the amount of steam which can be practically used and which can enter freely into the apparatus is restricted in the case of boiling in a vacuum.

The object of my invention lies in a process whereby the above-recited disadvantages and drawbacks are avoided; and it consists, essentially, in applying heat to the lower portion of a column of saccharine solution in presence of a vacuum and in lifting successive portions of the solution from said lower to the upper portion of the column through an open-ended conduit by introducing into the latter near its lower end series of bubbles of a gaseous fluid of a pressure but slightly greater than the pressure within the conduit at the point of introduction of the bubbles.

Figure 3:
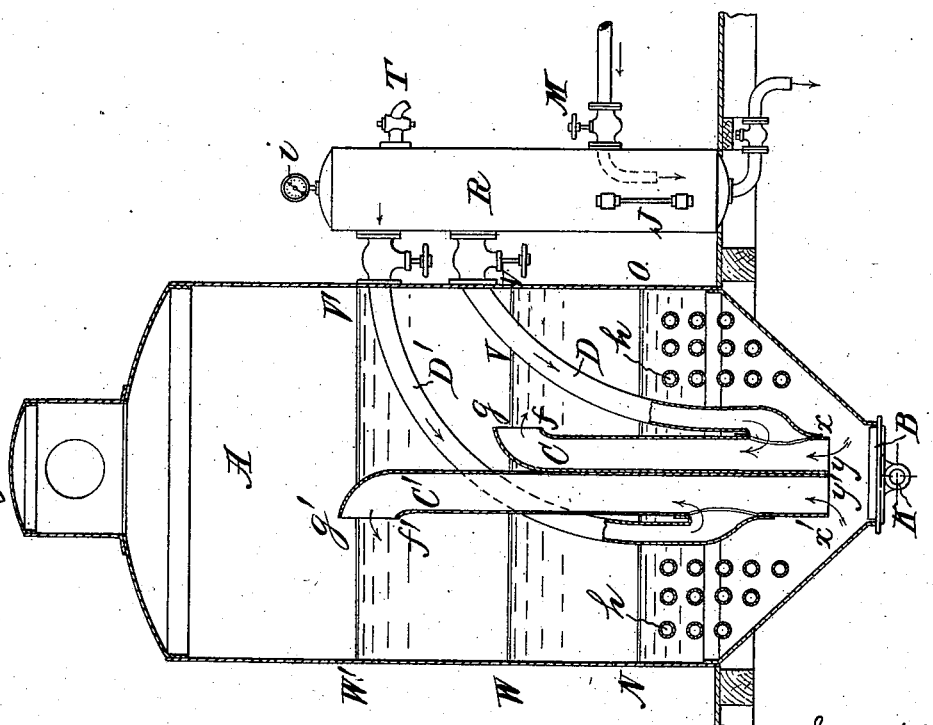

That my invention may be fully understood I will now describe the same in detail, reference being had to the accompanying drawings, which illustrate several forms of apparatus adapted to the carrying out of my said process, Figures 1, 2, and 3 being vertical sectional views, and Fig. 4 a like fragmentary view.

The accompanying drawings illustrate several forms of apparatus which serve to carry out the process in various ways.

In all the figures, A is the vacuum apparatus, in which sugar masses are to be boiled "to grain" in a vacuum.

B is the bottom of the vacuum apparatus, and $h$ represents heating devices.

K is the discharging device at the bottom of the apparatus, and C is the circulation-pipe, through which the sugar liquid circulates from the bottom to the top. This circulation-pipe (which may be replaced by a number of such pipes) is situated with its lower open end at some distance from the bottom wall of the vacuum apparatus. It therefore dips into the boiling liquid, while its upper open end extends up to the upper level of the liquid, or it may extend beyond the said level to a greater or less extent.

The process is carried out in the following manner: The steam, of a pressure which does not exceed the pressure at the bottom of the vacuum apparatus, is admitted into that part of the circulation-pipe dipping into the liquid or into the body of liquid inclosed by said pipe through a sufficiently large pipe, which is connected with the circulation-pipe above the lower end of the latter. This steam before entering the circulation-pipe is reduced approximately to the pressure existing at the lower open end of said pipe, so that it is only capable of entering the liquid contained in the circulation-pipe with such a small velocity that no coherent steam-jet, but only a series of successive steam-bubbles, (resulting in consequence of the large cross-sectional area of the inlet,) are able to enter the liquid contained in the circulation-pipe. In this pipe the steam-bubbles act solely by their buoyancy, and they therefore drive the liquid which is inclosed by the pipe through the upper open end of the said pipe up beyond the level of the liquid contained in the vacuum apparatus. Fresh sugar liquid enters continuously through the lower end of the circulating-pipe. In this manner with one kilogram of steam of reduced pressure about five thousand five hundred kilograms of sugar liquid can be carried up through the circulation-pipe from the bottom to above the level of the liquid. By means of a circulation-pipe of about three hundred millimeters diameter the contents of the largest vacuum apparatus generally used can be carried in a few minutes from the bottom of said apparatus to above the level of the boiling liquid contained in the apparatus. Instead of utilizing steam from any suitable source in the factory for the above purpose the steam which is necessary for the circulating-pipes may be generated in a separate boiling vessel with suitable heating-surface from the liquid itself which is to be boiled in the vacuum apparatus. Thus the boiling steam of the mass to be boiled may be employed as a moving agent in the above-described manner. For producing the said energetic circulating movement of the sugar masses instead of steam atmospheric air or some other chemically inert gas may be introduced in the vacuum apparatus after having previously reduced the pressure of the said air or gas to a suitable degree. In order to obtain a better crystallization, the air or other gas can be introduced in the sugar masses alternatingly with steam, and, viz., each of the said two mediums separately, one after the other.

The arrangement of the apparatus may be variously modified, according to the manner in which the process is carried out.

In the arrangement shown in Fig. 1 the steam, air, or gas passes through the valve D' and through the supply-pipe D from the reducing vessel R into the pipe C. This steam, air, or gas has been previously reduced to a pressure which does not exceed the pressure on the cross-sectional area $x\ y$. This steam, air, or gas, which may come from any suitable source, passes through the valve M into the vessel R. The pressure-gage $i$ indicates the pressure in the vessel R. E is a valve for the discharge of water of condensation. T is an air-cock, and J is a water-level gage. If instead of steam, air or any other inert gas is to be introduced in the vacuum apparatus, the process can also be carried out in such a manner that the admission-valve D' is put in direct communication with the outer air, (or with the respective gas.) The air or gas is then admitted direct through the valve D', and the expansion of the same takes place within the tube D. This tube D is in this case extended outward beyond the vacuum apparatus, and on this prolongated part of the tube, between the vacuum apparatus and the valve D', a vacuum-meter is arranged. By suitably regulating the spindle of the valve D' the vacuum within the tube D is regulated at will. At the commencement of the circulating movement the level of the liquid in the vacuum apparatus stands at about the level N O. The circulating-pipe C dips with its lower end almost down to the bottom, while the upper ejecting end $f\ g$ of the pipe C extends up to the level W V, which is to be attained by the liquid at the end of the boiling operation. The steam, air, or gas bubbles $p$, which rise in the pipe C, produce the circulation of the liquid.

Fig. 2 shows an arrangement in which the circulating steam for feeding the circulating-pipe is produced by boiling the cleare or thick sugar-juice in a separate vessel. S is the closed vessel, provided with a heating device $h'$ and with a supply-valve $b$ for the admission of the cleare or thick juice, which is ultimately to be boiled in the apparatus A to produce a crystallized mass. $p'$ is a valve through which the evaporated liquor is drawn out of the vessel S into the apparatus A. By means of the heating device $h'$ the cleare is boiled in the vessel S and there is produced steam of a pressure not greater than the pressure which obtains at the lower end $x\ y$ of the circulating-pipe in the vacuum apparatus.

Fig. 3 illustrates a suitable arrangement for producing circulation of boiling masses with high columns of liquid. In this case there are arranged two or more circulating-pipes C C', which dip with their lower ends $x\ y$ and $x'\ y'$ equally deep into the liquid, but have their ejecting ends $f\ g$ and $f'\ g'$ at different heights. The circulating-pipes are therefore caused by the rising of the level of the liquid during the boiling operation to come into use one after the other. For example, the pipe C acts up to the level W V, and when this level has been reached the pipe C' acts until the highest level W' V' is reached, up to which the liquid rises when the boiling process is completed. After reaching this level the two pipes C C' may work together for a time.

Fig. 4 illustrates an arrangement in which the circulating-pipe C is arranged outside of the vacuum-body and is connected, by means of short tubes or sockets F F', with the interior of the vacuum-body.

I claim—

1. The process, which consists in applying heat to the lower portion of a column of saccharine solution in presence of a vacuum and lifting successive portions of the solution from said lower to the upper portion of said column through an open-ended conduit, by introducing into the latter near its lower end series of bubbles of a gaseous fluid of a pressure but slightly greater than the pressure within the conduit at the point of introduction of the bubbles, for the purpose set forth.

2. The process, which consists in applying heat to the lower portion of a column of saccharine solution in presence of a vacuum and lifting successive portions of the solution from said lower to the upper portion of said column through an open-ended conduit, by introducing into the latter near its lower end series of bubbles of a gaseous fluid of a pressure but slightly greater than the pressure within the conduit at the point of introduction of the bubbles, each of said bubbles containing sufficient of the fluid to cause them to expand approximately to the full internal diameter of said conduit, substantially as and for the purpose set forth.

In testimony that I claim the foregoing as my invention I have signed my name in presence of two subscribing witnesses.

CARL STEFFEN.

Witnesses:
　HENRY C. CARPENTER,
　ALVESTO S. HOGUE.